United States Patent [19]

Nguyen et al.

[11] Patent Number: 5,887,275
[45] Date of Patent: Mar. 23, 1999

[54] METHOD AND APPARATUS FOR LOCATING A FIRST SET OF DATA USING A GLOBAL IDENTIFIER AND A VIRTUAL ADDRESSING DATA STRUCTURE

[75] Inventors: Tin Anh Nguyen, Danville; Joyo Wijaya, Menlo Park; John Boonleungtomnu, San Jose, all of Calif.

[73] Assignee: Oracle Corporation, Redwood Shores, Calif.

[21] Appl. No.: 598,517

[22] Filed: Feb. 8, 1996

[51] Int. Cl.$^6$ .................................................. G06F 12/08
[52] U.S. Cl. ........................................ 711/206; 707/100
[58] Field of Search .................................. 711/203, 206; 707/103, 100; 395/683

[56] References Cited

U.S. PATENT DOCUMENTS

| | | | |
|---|---|---|---|
| 4,660,142 | 4/1987 | Clancy et al. | 711/202 |
| 5,522,077 | 5/1996 | Cuthbert et al. | 395/683 |
| 5,581,765 | 12/1996 | Munroe et al. | 395/682 |
| 5,615,362 | 3/1997 | Jensen et al. | 707/103 |
| 5,615,363 | 3/1997 | Jenness | 707/103 |
| 5,634,124 | 5/1997 | Khoyi et al. | 707/103 |

OTHER PUBLICATIONS

Andrea H. Skarra et al., "The Management of Change Types in an Object–Oriented Database," OOPSLA '86 Proceedings, Brown University, Department of Computer Science, Providence RI, pp. 483–495 (Apr. 1986).

John F. Roddick, "Schema Evolution in Database Systems—An Annotated Bibliography," SIGMOD Record, vol. 21, No. 4, Dec. 1992, School of Computer and Information Science, University of South Australia, The Levels, SA 5095, South Australia, pp. 35–39.

Elisa Bertinno et al., "Object–Oriented Database Management Systems: Concept and Issues," Computer, vol. 24, No. 4, 15 pages (Apr. 1991).

J. Eliot, B. Moss, "Working with Persistant Objects: To Swizzle or Not to Swizzle," IEEE Transactions on Software Engineering, vol. 18, No. 8, Aug. 1992.

Charles W. Krueger, "Software Reuse," ACM Computing Surveys, vol. 24, No. 2, 53 pages (Jun. 1992).

K. Narayanaswamy et al., "An Incremental Mechanism for Schema Evolution in Engineering Domains," 4th Int'l Conference on Data Engineering, Los Angeles, California pp. 294–301 (1988).

Simon Monk et al., "Schema Evolution in OODBs Using Class Versioning," SIGMOD Record, vol. 22, No. 3, pp. 16–22 (Sep. 1993).

(List continued on next page.)

*Primary Examiner*—Eddie P. Chan
*Assistant Examiner*—Gary J. Portka
*Attorney, Agent, or Firm*—McDermott, Will & Emery

[57] ABSTRACT

A method and apparatus are provided for locating a object based on a reference to the object. An application determines whether the reference has previously been used to locate the object. If the reference has previously been used to locate the object, then a data structure referred to as a "tombstone" that has been associated with the object is located based on a first virtual memory address that is stored in the reference. Once the tombstone has been located, a first pseudo-timestamp that is stored in the reference is compared to a second pseudo-timestamp that is stored in the tombstone. If the first pseudo-timestamp matches the second pseudo-timestamp, then the object is located based on a second virtual memory address that is stored in the tombstone. If the first pseudo-timestamp does not match the second pseudo-timestamp or if the reference has not been previously used to locate the object, then the object is located based on the identifier stored in the reference. During the process of locating the object based on the object identifier, the virtual address of the tombstone associated with the object is stored in the reference, and the pseudo-timestamp stored in the tombstone is stored in the reference. When tombstones are reused, the pseudo-timestamp within the tombstone is incremented.

23 Claims, 7 Drawing Sheets

OTHER PUBLICATIONS

J.F. Roddick, "Dynamically Changing Schemas Within Database Models," Australian Computer Journal, vol. 23, No. 3, pp. 105–109 (1991).

Jay Banerjee et al., "Semantics and Implementation of Schema Evolution in Object–Oriented Databases," ACM 0–89791–236–5, pp. 311–322 (1987).

D. Beech et al., "Generalized Version Control in an Objected–Oriented Database," 4th IEEE–Int'l Conference on Data Engineering, Los Angeles, California, pp. 14–22 (1988).

Simon Gibbs et al., "Class Management for Software Communities," Communications of the ACM, vol. 33, No. 9, pp. 90–103 (1990).

G.T. Nguyen et al., "Schema Evolution in Objected–Oriented Database Systems," Data & Knowledge Engineering 4, pp. 43–67 (1989).

B.S. Lerner et al., "Beyond Schema Evolution to Database Reorganization," SIGPLAN Notices, vol. 25, No. 10, pp. 67–76 (1990).

D.Jason Penney et al., "Class Modification in the GemStone Object–Oriented DBMS," SIGPLAN Notices (Proceedings of OOPSLA 1987), vol. 22, No. 12, pp. 111–117 (1987).

L. Tan et al., "Meta Operations for Type Management in Object–Oriented Databases—a Lazy Mechanism for Schema Evolution," 1st Int'l Conf., Kyoto, Japan, pp. 241–258 (1989).

Stanley B. Zdonik, "Object–Oriented Type Evolution," *Advances in Database Programming Languages*, ACM Press, New York, pp. 277–288 (1990).

METHOD AND APPARATUS FOR LOCATING A FIRST SET OF DATA USING A GLOBAL IDENTIFIER AND A VIRTUAL ADDRESSING DATA STRUCTURE

FIELD OF THE INVENTION

The present invention relates to reference swizzling, and more specifically, to a method and apparatus for swizzling references using pseudo-timestamps.

BACKGROUND OF THE INVENTION

Many computer programs model problems as sets of inter-related objects. During execution, such programs perform operations on objects that are stored as data structures in the memory of the computer system. Objects may have numerous attributes, including attributes that represent relationships to other objects. When a first object has an attribute that represents a relationship to a second object, the first object is referred to as the source object and the second object is referred to as the target object.

The information used to represent an attribute that represents a relationship with a target object is referred to as a "reference". A reference to a target object is stored in the data structure that represents the source object. For many applications, the most common operation in processing objects is to locate the target object based on the reference to the target object contained in the source object. This operation is known as reference traversal.

Many programs use a data type called a "pointer" as a reference to a target object. A pointer indicates the memory location of the data structure that corresponds to the target object. To allow a program to access more objects than can fit in the available dynamic memory, pointers typically indicate the virtual memory address of the target object rather than the actual physical address of the dynamic memory location at which the target object resides. When a program uses the virtual memory address as the representation of the reference, the program relies on the underlying virtual memory mechanism of the computer operating system and hardware for looking up the physical memory addresses of target objects.

When an object is in dynamic memory, the virtual memory address of the object is the optimal representation for a reference to the object because most computers have a built-in hardware lookup mechanism and high-speed memory for an address translation table that maps virtual memory addresses to physical memory addresses. In addition, operating systems typically provide very efficient memory caching support based on virtual memory access. By employing the built-in address translation and memory caching mechanisms, the use of virtual memory addresses as references to target objects results in a highly efficient reference traversal.

Unfortunately, virtual memory addresses are dynamically allocated and are thus only valid within and during a particular program execution. Therefore, a virtual memory address used for a target object during one execution of a program may not be the same for the same target object during a subsequent execution of the same program. Similarly, the virtual memory address of any given target object may not be the same for two concurrently executing programs. Therefore, virtual memory addresses cannot be used as the sole representation of references to target objects in environments where objects are shared across different executions of the same program, or across different concurrently-executing programs.

In a database management system (DBMS), the information used for references must correctly identify objects across all program executions. Therefore, a unique object identifier (OID) is assigned to each object. Unlike virtual memory addresses, the OID of an object uniquely identifies the object across all program executions. However, if the OID is used as a reference to an object stored in dynamic memory, each traversal operation requires mapping the OID to the virtual memory address of the target object, and then mapping the virtual memory address to the physical memory address of the target object. The process of mapping an OID to a virtual memory address consumes significantly more processing time than mapping a virtual memory address to a physical address.

Various attempts have been made to achieve the efficiency of reference traversals with virtual memory addresses while still being able to share objects between multiple programs and multiple executions of the same program. Typically, these approaches use OIDs as references to objects that are not currently loaded into dynamic memory, and virtual memory addresses as references to objects that have been loaded into dynamic memory. Therefore, references to an object must be converted from one form to another when the object is transferred between static memory and dynamic memory. The process of converting references between an external form and an internal form is referred to as reference swizzling.

According to one prior art reference swizzling technique, when an object is loaded from disk into main memory, all of the references contained within the object are converted into virtual memory addresses. Since the target objects of those references may not be in main memory, virtual memory addresses must be pre-allocated for the target objects as if they were already in main memory.

When a reference to a target object that is not in main memory is traversed, the DBMS loads the target object into main memory. To detect such reference traversal operations, the DBMS relies on the computer operating system by setting all pre-allocated virtual memory addresses in access-protected mode. When an access-protected virtual memory address is accessed, the computer operating system detects a memory access protection violation and raises an exception. The DBMS handles the exception by loading the desired target object into main memory and changing the virtual memory address to a mode that allows access.

While the use of protected mode allows for fast reference swizzling, it relies on special operating system supports, such as the memory access control, detection, and exception handling functions of the operating system. Unfortunately, these supports may deviate from platform to platform, and may even be unavailable in some platforms. Therefore, this approach is not practical for DBMS systems that are intended for use on multiple platforms. Further, because memory has been pre-allocated for all of the objects, the memory cannot be reused for other purposes. Therefore, applications that use a large number of objects may run out of memory.

According to an alternative approach, each reference is a data structure that contains a discriminant field and a variant field. The value in the discriminant field indicates whether the variant is an object identifier or the virtual memory address of the target object. Each object in main memory has a "surrogate" that is a data structure containing a reference count, the object identifier of the target object, and the virtual memory address of the target object. When the DBMS loads an object from disk into main memory, the value of the discriminant of each reference contained in the object is initially set to indicate that the corresponding variant is the object identifier of the target object.

When an application traverses the reference, the DBMS determines whether the discriminant of the reference indicates that the variant is an object identifier or a virtual memory address. If the variant is a virtual memory address, then the virtual memory address is used to locate the surrogate. The virtual memory address stored in the surrogate is then used to locate the target object.

If the variant is an object identifier, then the DBMS looks up the virtual memory address of the surrogate. If the surrogate exists, then the variant of the reference is set to the virtual memory address of the surrogate. The discriminant of the reference is set to indicate that the variant is the virtual memory address of the surrogate. The reference count of the surrogate is then incremented by one.

If the surrogate does not exist, then the target object is loaded from disk into main memory, a surrogate is allocated for the target object, the object identifier and the virtual memory address in the surrogate are set to those of the target object and the reference count of the surrogate is set to zero. Then, the DBMS performs the steps of setting the variant, setting the discriminant, and incrementing the reference count, as described above.

When an object is saved to disk, the DBMS decrements the reference count of all of the surrogates pointed to by the references in the object. Therefore, at any given time, the reference count of a surrogate indicates how many references are currently pointing to the surrogate. Only when the reference count of a surrogate is zero may the object pointed to by the surrogate be swapped to disk and the surrogate deallocated.

One disadvantage of the surrogate technique is that the DBMS cannot swap an object to disk to free up memory as long as an object that has a traversed reference to the object remains in memory. Consequently, the DBMS may become significantly limited with respect to how it may free up memory to load newly referenced objects. In addition, the process of decrementing surrogates adds overhead to the process of storing objects to disk.

Based on the foregoing, it is clearly desirable to provide a mechanism for and method for swizzling references to objects that increases the reference traversal speed over using OIDs as the representation for references. It is further desirable to provide a mechanism for swizzling references that does not rely on support from specific platforms.

SUMMARY OF THE INVENTION

A method and apparatus are provided for locating a first object based on a reference to the first object. According to the method, an application determines whether the reference has previously been used to locate the first object.

If the reference has previously been used to locate the first object, then a data structure referred to as a "tombstone" that has been associated with the first object is located based on a first virtual memory address that is stored in the reference.

Once the tombstone has been located, a first pseudo-timestamp that is stored in the reference is compared to a second pseudo-timestamp that is stored in the tombstone. If the first pseudo-timestamp matches the second pseudo-timestamp, then the first object is located based on a second virtual memory address that is stored in the tombstone.

If the first pseudo-timestamp does not match the second pseudo-timestamp, then the first object is located based on an identifier stored in the reference. Similarly, if the reference has not been previously used to locate the first object, then the first object is located based on the identifier stored in the reference.

According to one aspect of the invention, the first object is located based on the identifier stored in the reference by first inspecting a table that contains, entries that associate identifiers with tombstones. If the table contains an entry that associates the identifier stored in the reference with a particular tombstone, then the particular tombstone is located based on information that is contained in the entry. The first object is then located based on a virtual memory address stored in the particular tombstone.

According to another aspect of the invention, if the table does not contain an entry that associates the identifier stored in the reference with a particular tombstone, then the first object is located on a persistent storage device based on the identifier that is contained in the reference. The first object is then loaded into main memory. A particular tombstone is assigned to the first object. An entry that associates the identifier with the particular tombstone is added to the table. A pseudo-timestamp in the particular tombstone is set. A third virtual memory address that identifies where the first object is located in the main memory is stored in the particular tombstone. The first virtual memory address in the reference is replaced with a fourth virtual memory address that identifies where the particular tombstone is located. The pseudo-timestamp that is contained in the particular tombstone is stored in the reference.

Systems that use the reference mechanism described herein are able to deallocate back to the operating system the dynamic memory occupied by any object without the worry of invalidating existing references to the object as long as no program continues to use direct pointers to the original object. Memory freed in this manner may be re-allocated to store another object any time the operating system is out of dynamic memory space. Programs that have been passed direct pointers during "pin" operations indicate that they will no longer use the direct pointers to a particular object by performing an "unpin" operation on the object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

HARDWARE OVERVIEW

A method and apparatus for swizzling references to objects is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
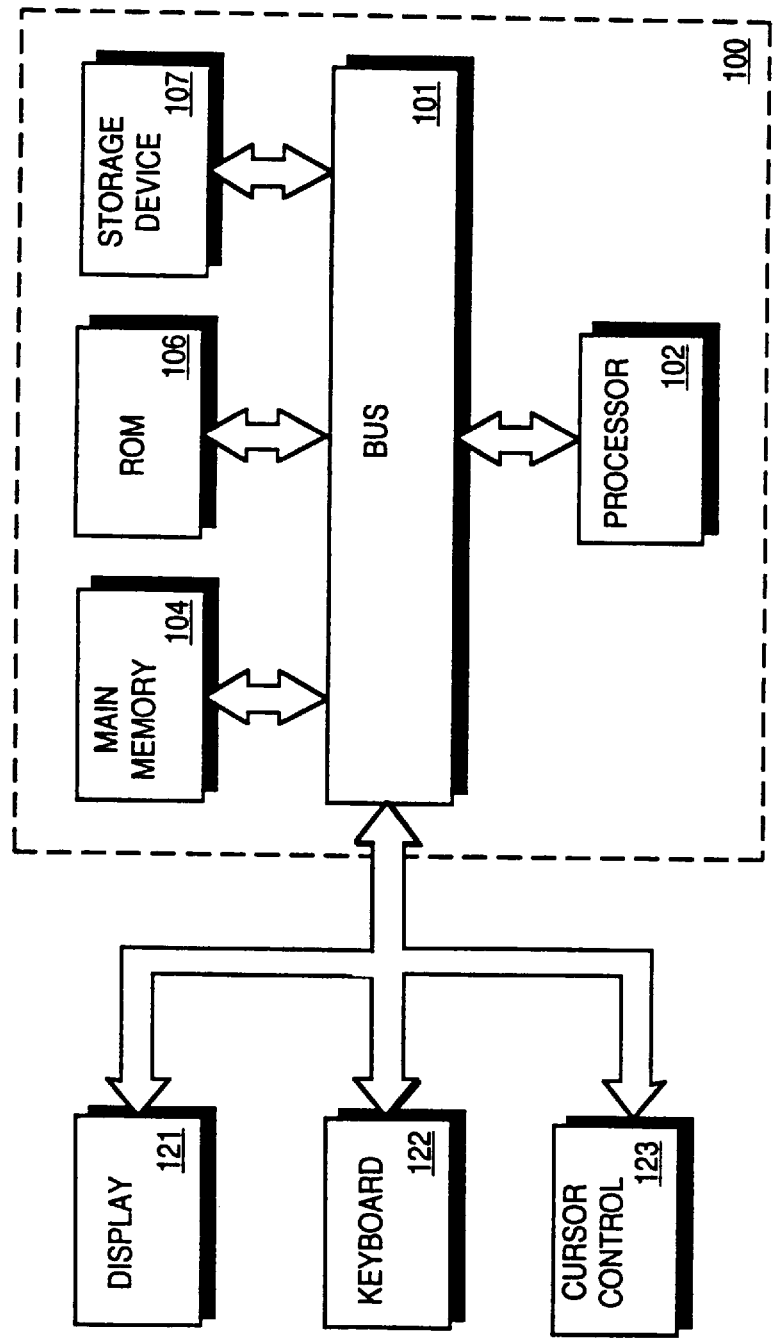
FIG. 1 is a block diagram illustrating a computer system that may be used to implement the present invention.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to swizzle references to objects as the objects are moved between a persistent store, such as storage device 107, and a dynamic store, such as main memory 104. According to one embodiment, reference swizzling is performed by computer system 100 in response to processor 102 executing sequences of instructions contained in memory 104. Execution of the sequences of instructions contained in memory 104 causes processor 102 to swizzle references by making use of a data structure referred to as a tombstone, as will be described hereafter. In alternative embodiments, hard-wired circuitry may be used in place of or in combination with software instructions to implement the present invention. Thus, the present invention is not limited to any specific combination of hardware circuitry and software.

REFERENCES

According to one embodiment of the invention, the references contained in an object stored on a storage device 107 have only one field: the OID of the target object. When an object is loaded into main memory 104, the references within the object are represented with three fields: the OID of the target object, the virtual memory address of the target object, and a pseudo-timestamp.

When a source object is loaded into main memory 104, the virtual memory addresses of the target objects of the source object are initially unknown. Further, it is not even known whether the target objects have themselves been loaded into main memory 104. Therefore, the virtual memory address field of all references contained within a source object are initialized to NULL when the source object is first loaded into main memory 104. The initial value of the pseudo-timestamp is irrelevant, since the pseudo-timestamp of a reference is not valid while the virtual memory address field of the reference is NULL. When a source object is stored back to the storage device 107, only the OID field of the references contained within the source object are saved.

TOMBSTONES

As mentioned above, the references contained in an object that has been loaded into memory include an OID field, a virtual memory address field that is initially NULL, and a pseudo-timestamp field that is initially invalid. Therefore, when the first traversal operation is performed on the reference, the OID contained in the OID field of the reference is the only valid data available for looking up the target object of the reference.

As mentioned above, traversal operations performed based on the OID of an object are much less efficient than traversal operations that take advantage of built-in virtual memory address translation mechanisms. Therefore, the present invention includes a mechanism for gathering information during the first traversal of a reference so that subsequent traversals of the same reference may be performed more efficiently.

Figure 2:
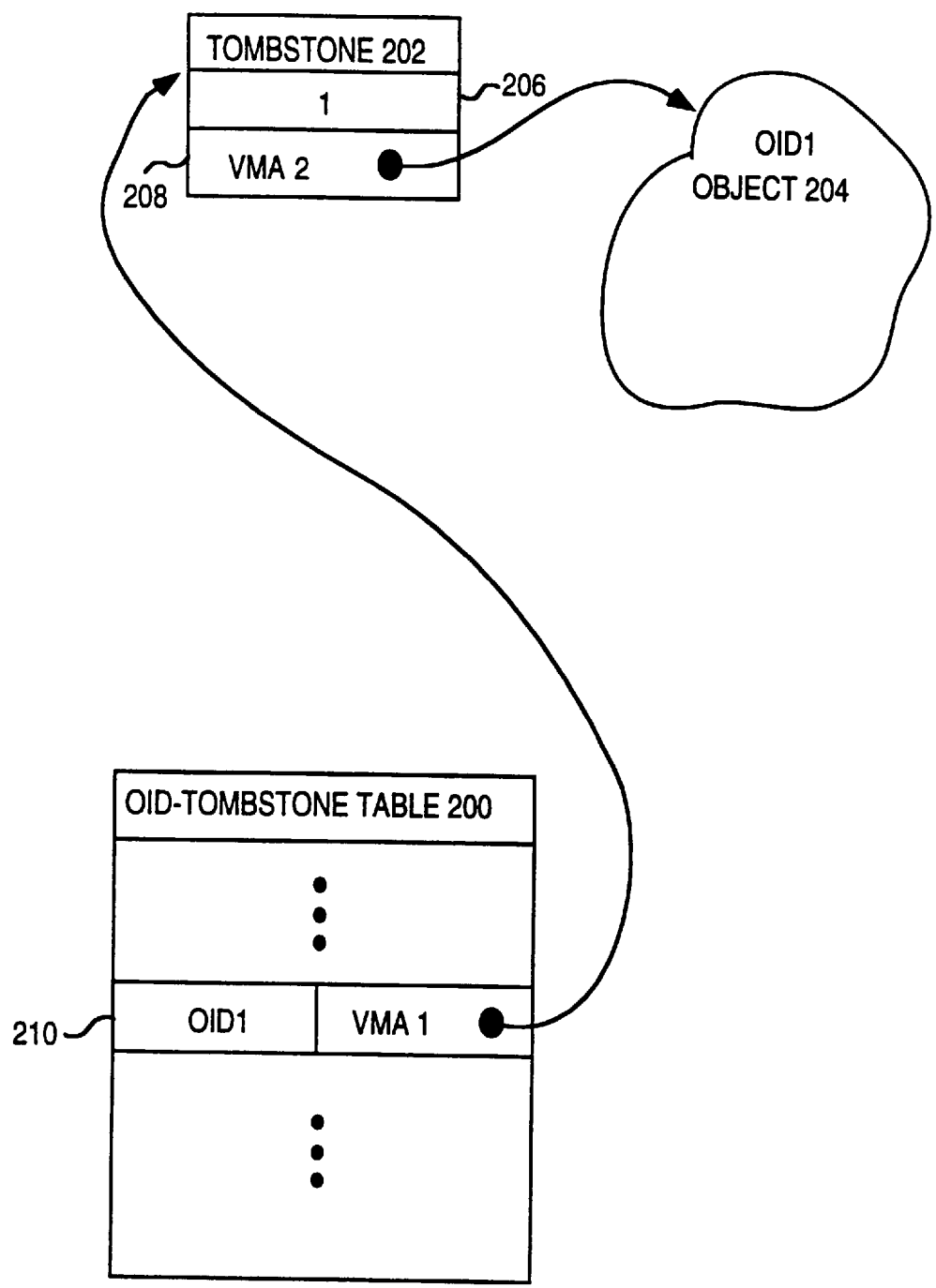
FIG. 2 illustrates an object cache according to an embodiment of the present invention.

To implement an efficient swizzling mechanism, a data structure referred to as a tombstone is assigned to each object as that object is loaded into main memory 104. FIG. 2 illustrates a tombstone 202 that has been assigned to an object 204 according to an embodiment of the present invention. A tombstone 202 has two fields: a pseudo-timestamp field 206 and a virtual memory address field 208. The virtual memory address field 208 is set to the virtual memory address of the object 204 that corresponds to the tombstone 202. If the tombstone 202 is newly created for the object, then the pseudo-timestamp field is set to some initial value, such as "1". If a tombstone had previously been assigned to another object that has subsequently been stored on the storage device 107, the value in the pseudo-timestamp field 206 is incremented when the object is saved out to storage device 107.

The pseudo timestamp field is large enough to contain a value that potentially reaches infinity as the value within the field is incremented. Various techniques may be employed to guarantee that pseudo-timestamp values never wrap around to a previously used (smaller) value.

When a tombstone is assigned to an object, an entry is added to an OID-to-tombstone table 200. The entry includes the OILD of the object and the virtual memory address of the tombstone assigned to the object. OID-to-tombstone table 200 may be implemented using any one of a number of techniques, such as a hash function or a binary index. The present invention is not limited to the use of any particular type of table.

In the object cache illustrated in FIG. 2, an entry 210 has been added to OID-to-tombstone table 200 to indicate the virtual memory address of the tombstone 202 that corresponds to the object with OID1 (i.e. object 204) When an object is stored back to the storage device 107, the tombstone is no longer assigned to the object. Therefore, the entry in the OID-to-tombstone table that contains the OID of the object is deleted from the OID-to-tombstone table.

SWIZZLING MECHANISM

Figure 3:
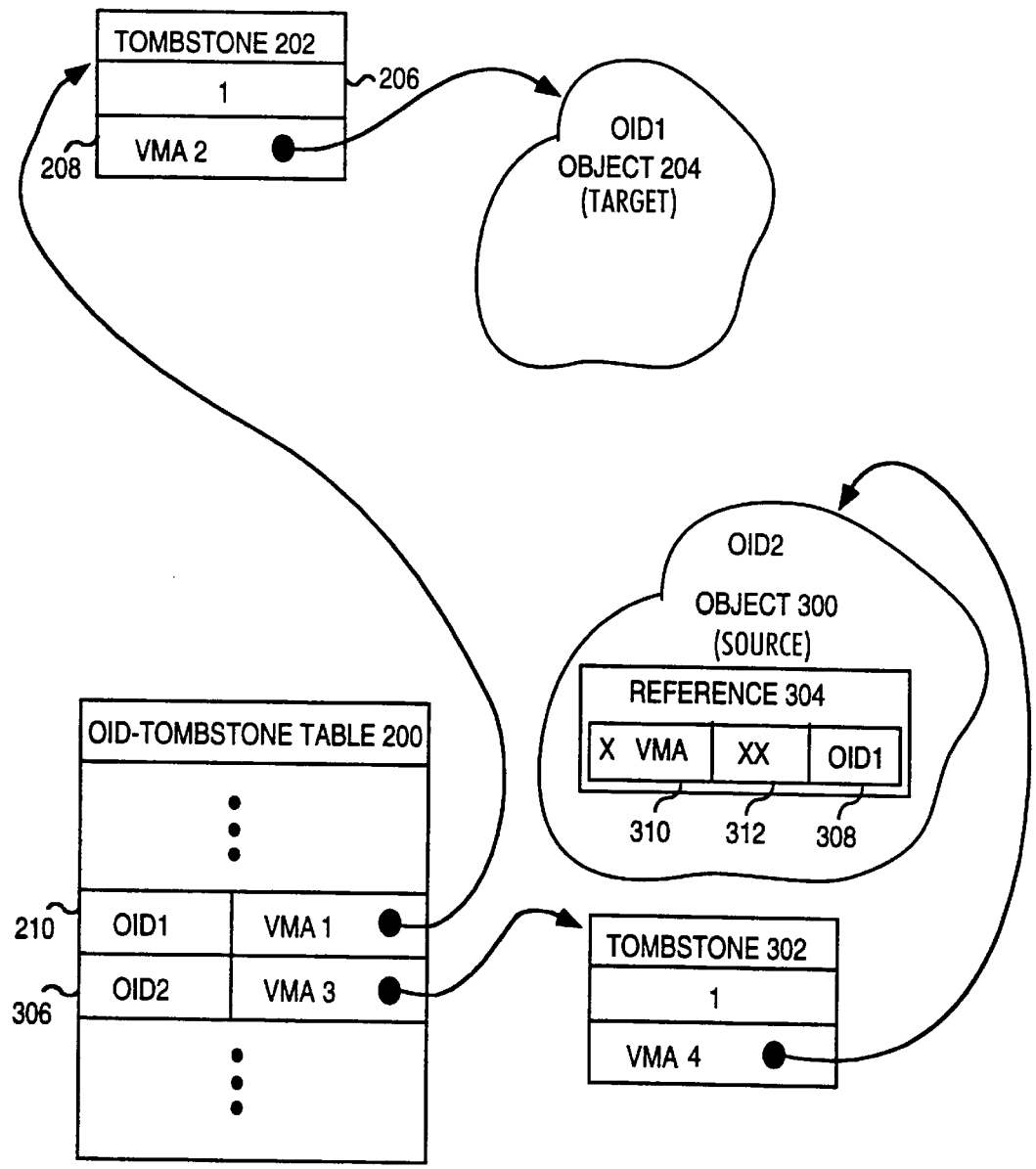
FIG. 3 illustrates the object cache of FIG. 2 in which a second object has a reference to a first object.

The use of tombstones and an OID-to-tombstone table 200 to provide an efficient swizzling mechanism shall now be described with reference to FIG. 3. FIG. 3 illustrates an object cache within main memory 104 that includes an object 300 that has a reference 304 to object 204.

When object 300 was loaded into main memory 104, the loading process described above was performed for object 300. Specifically, a tombstone 302 was assigned to object 300, and an entry 306 was placed in the OID-to-tombstone table 200 to indicate the location of the tombstone 302 assigned to object 300. The entry 306 includes the OIID of object 300 (OID2) and the virtual memory address of tombstone 302. The virtual memory address of object 300 is stored in the tombstone 302 that is assigned to object 300. Assuming that tombstone 302 is newly created, the pseudo-timestamp of tombstone 302 is initialized to "1".

As explained above, the references contained in an object that has been loaded into memory has an OID field 308, a virtual memory address field 310, and a pseudo-timestamp field 312. The OID of the target object is stored with the source object when the source object is stored to storage device 107. Therefore, when the source object is loaded into memory, the stored OID of the target object is loaded into the OID field 308 of the reference. In the illustrated example, the OID of object 204 (OID1) has been loaded into the OID field 308 of reference 304.

When an application loads object 300, the application does not know the location of object 204, or even whether object 204 is loaded into main memory 104. Therefore, the virtual memory address field 310 is initially set to NULL and the pseudo-timestamp field 312 is initially invalid. The values of the fields in reference 304 remain unchanged until the application performs a reference traversal using the reference.

When the application performs a reference traversal on reference 304, the application first inspects the value in the virtual memory address field 310 of the reference 304. When the value contained in the virtual memory address field 310 is NULL, the application knows that the current reference traversal is the first reference traversal performed by the application on reference 304. Because it is the first reference traversal on the reference 304, the OID of the target object contained in OID field 308 must be used to perform the reference traversal.

To perform a reference traversal based on the OID of the target object, the application searches OID-to-tombstone table 200 for an entry containing the OID of the target object. In the illustrated example, the OID of the target object 204 is OID1 and entry 210 contains the value OID1. Therefore, as a first step in the first reference traversal of reference 304, an application will find entry 210. By inspecting entry 210, the application determines the virtual memory address of the tombstone 202 that corresponds to the target object 204. The application then stores the virtual memory address of the tombstone 202 that corresponds to the target object 204 in the virtual memory address field 310 of the reference.

Based on the virtual memory address in entry 210, the application finds and inspects the tombstone 202 that corresponds to the target object 204. The application copies the pseudo-timestamp 206 stored in the tombstone 202 into the pseudo-timestamp field 312 of the reference 304. The application then completes the reference traversal operation by finding and inspecting the target object 204 based on the virtual memory address stored in the virtual memory address field 208 of tombstone 202.

Figure 4:
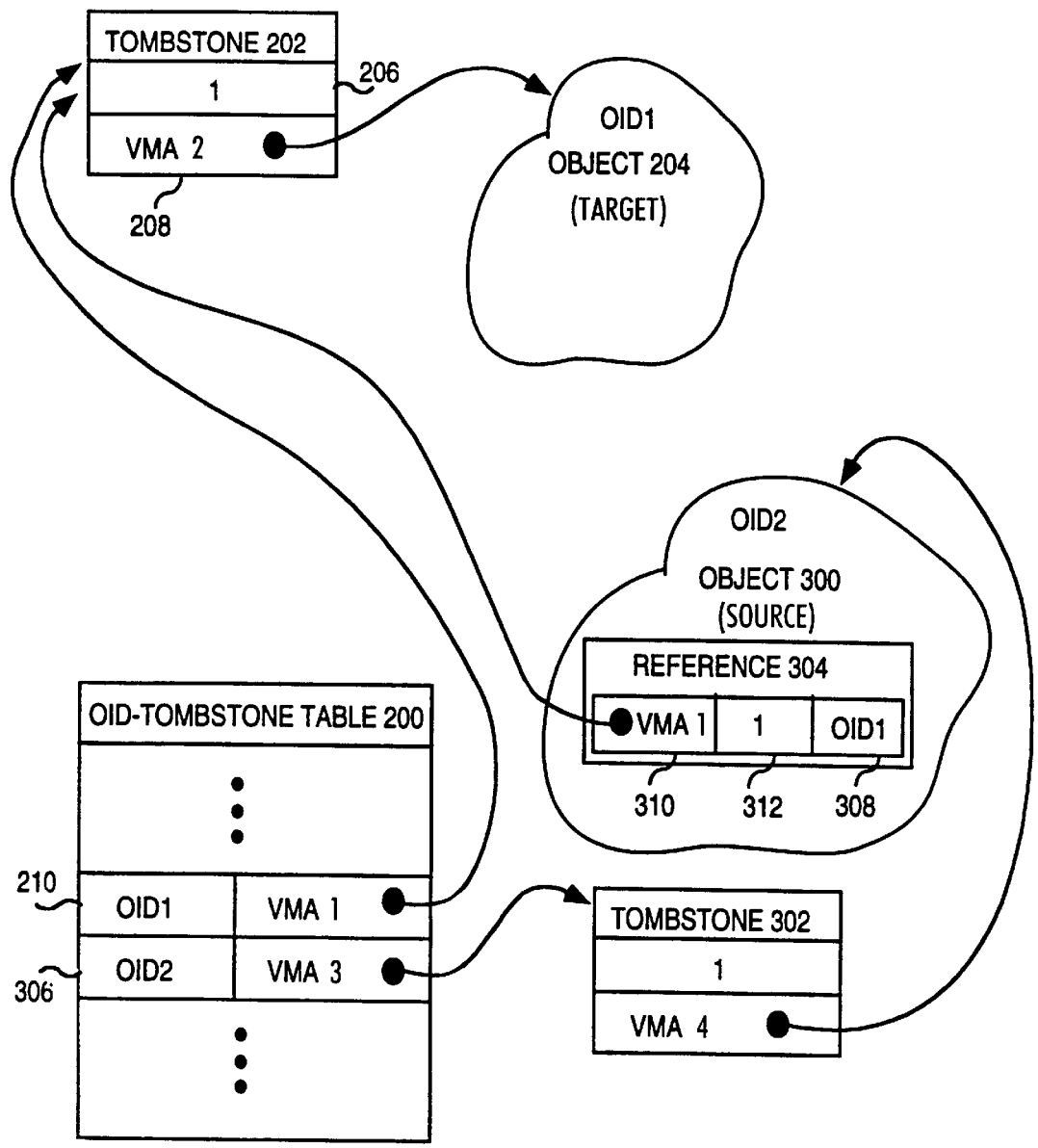
FIG. 4 illustrates the object cache of FIG. 3 after a reference traversal has been performed on the reference contained in the second object.

At the end of the first reference traversal of reference 304, reference 304 will contain the values shown in FIG. 4. Once the virtual memory address of the tombstone 202 of the target object 204 is stored in the virtual memory address field 310 of a reference 304, the virtual memory address of the tombstone 202 is used to perform subsequent reference traversals on reference 304. Specifically, an application performs the reference traversal simply by locating tombstone 202 based on the virtual memory address stored in virtual memory address field 310, and locating object 204 based on the virtual memory address stored in the virtual memory address field 208 of tombstone 202. These lookup operations may be performed efficiently because they take advantage of the built-in virtual address lookup mechanism of the computer system.

PSEUDO-TIMESTAMPS

When there is not enough storage available in main memory 104 to store an object that is referenced by an application, an object that is currently in the main memory 104 is stored back to the storage device 107 to free up space for the referenced object. The referenced object is then loaded into main memory 104.

When an object is stored back to the storage device 107, the tombstone for the object remains in the main memory 104 but is no longer associated with the object. To indicate that the tombstone is no longer associated with the stored object, the entry that contains the OID value of the object is removed from the OID-to-tombstone table. In addition, the value in the pseudo-timestamp field of the tombstone is incremented. The tombstone that belonged to the object that was stored back to disk may then be reused as a tombstone for the newly-loaded object.

Figure 5:
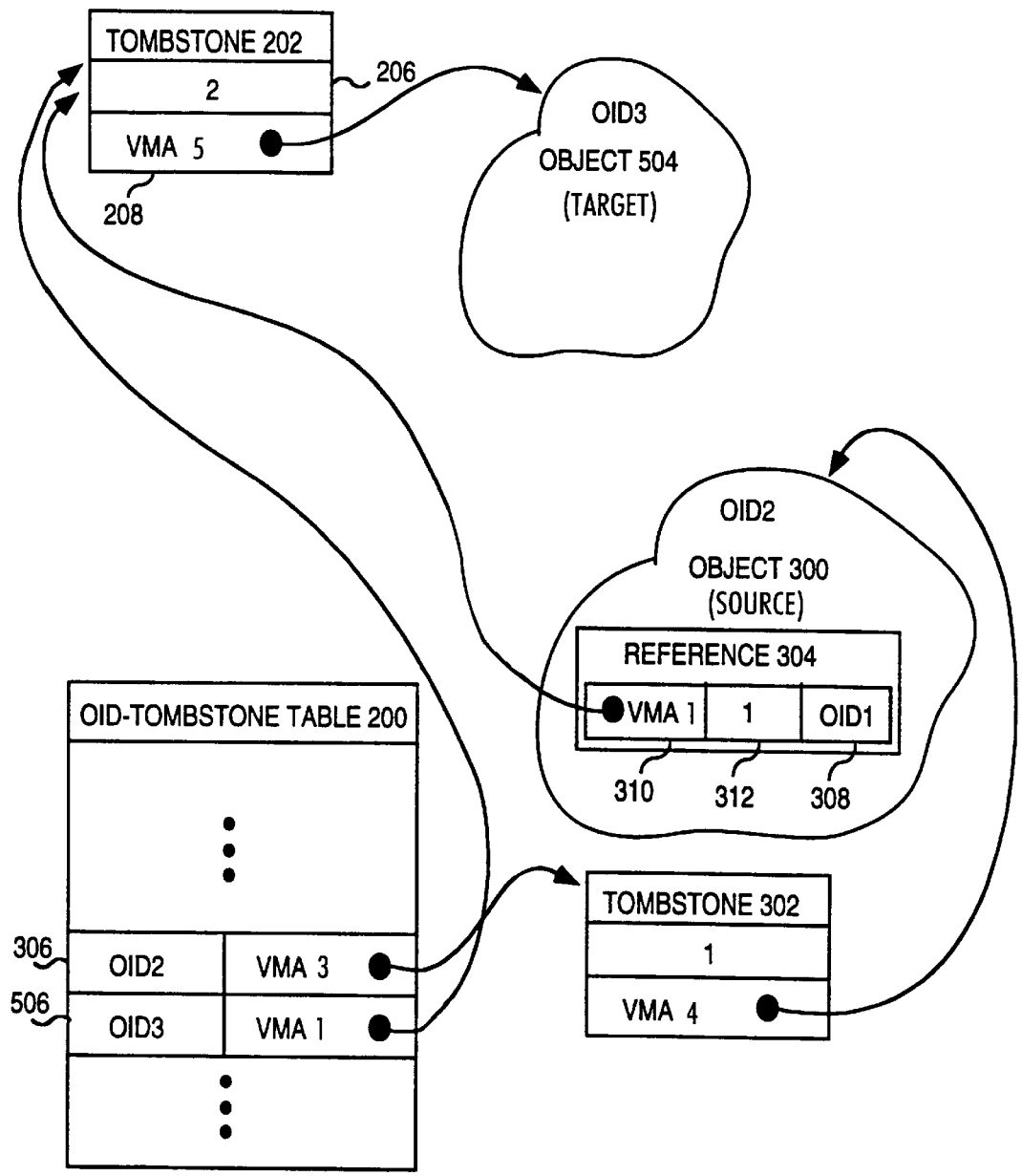
FIG. 5 illustrates the object cache of FIG. 4 after the first object has been swapped out and the tombstone previously used for the first object has been reused for a third object.

FIG. 5 illustrates the object cache of FIG. 4 after object 204 has been stored out to the storage device 107 and tombstone 202 has been reused for a newly loaded object 504. When object 204 was removed from the main memory 104, the entry 210 for object 204 was removed from OID-to-tombstone table 200. In addition, the pseudo-timestamp field of tombstone 202 was incremented. When tombstone 202 was assigned to the new object 504, the address in virtual memory address field 208 of tombstone 202 was updated to point to the virtual memory location of object 504, and an entry 506 that indicates the association of object 504 and tombstone 202 was added to OID-to-tombstone table 200.

After these operations have been performed, the tombstone 202 identified by the virtual memory address stored in virtual memory address field 310 will no longer correspond to the object identified by the OID contained in OID field 308. If an attempt is then made to traverse the reference 304 using the value stored in the virtual memory address field 208 of tombstone 202, the reference traversal will identify the wrong object (object 504). To prevent this from happening, the pseudo-timestamps are used to determine whether a tombstone pointed to by a reference still corresponds to the object associated with the reference.

For example, during the first stage of a reference traversal of reference 304, tombstone 202 will be located based on the virtual memory address contained in virtual memory address field 310. However, before proceeding with the second stage of the reference traversal operation where the target object is located based on the value stored in the virtual memory address field 208 of the tombstone 202, the pseudo-timestamp of the reference is compared with the pseudo-timestamp of the tombstone. If the pseudo-timestamps match, then the tombstone still corresponds to the target object of the reference, so the application proceeds to locate the target object based on the value stored in the virtual memory address field 208 of the tombstone 202. If the pseudo-timestamps do not match, then the target object has been stored to permanent storage 106 since the last time a reference traversal was performed on the reference 304. Therefore, the application performing the traversal must once again locate the target object based on the OID stored in the reference 304.

OBJECT LOADING PROCESS

Figure 6:
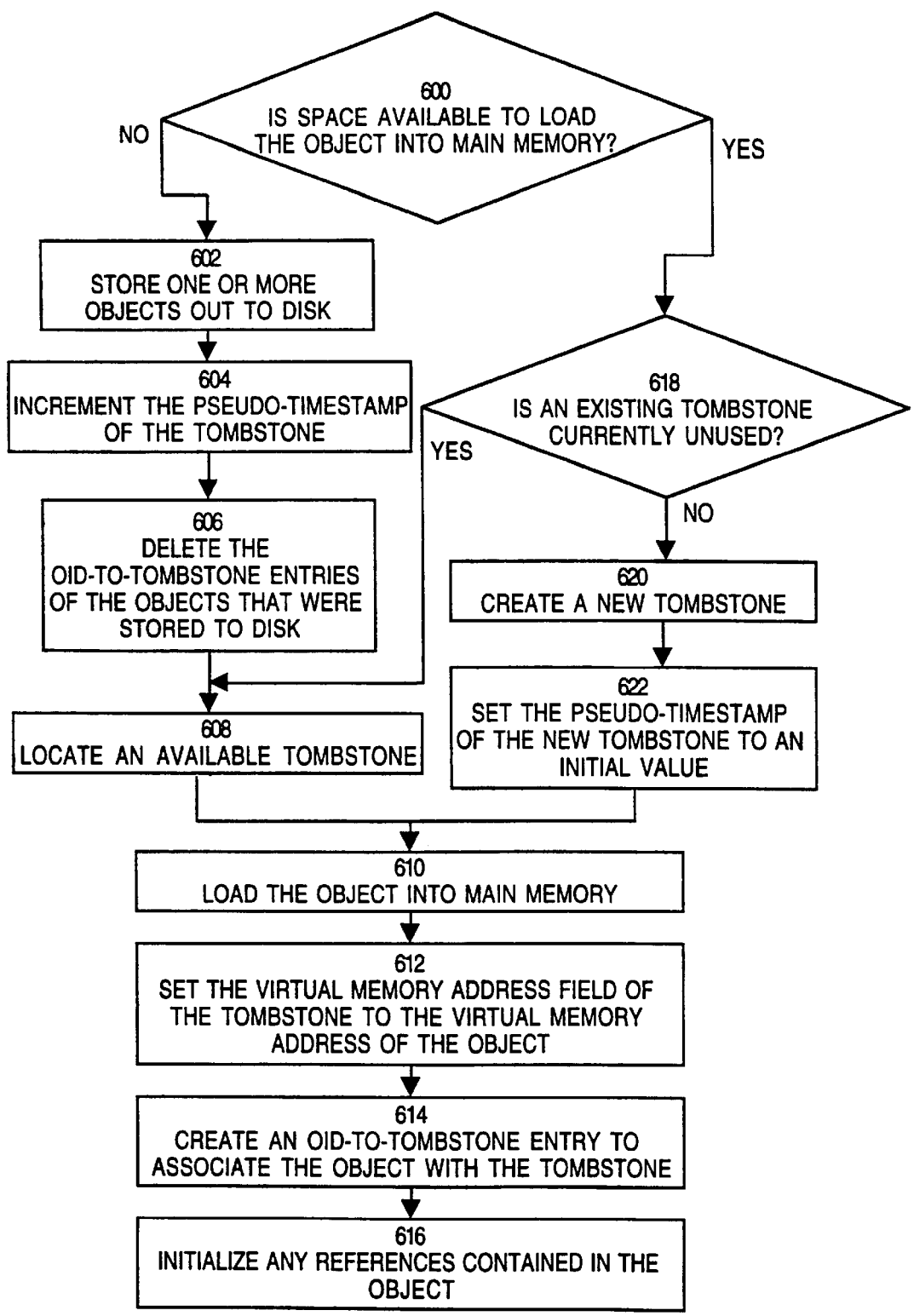
FIG. 6 is a flow chart illustrating steps performed to load an object into memory according to an embodiment of the invention.

FIG. 6 is a flow chart illustrating the steps performed when an object is loaded from permanent memory 106 into main memory 104. At step 600, it is determined whether enough space is available in main memory 104 to store the object. If enough space is available, then control passes to step 618. Otherwise, control passes to step 602.

At step 602, storage space in main memory 104 is made available by storing out to the storage device 107 one or more objects currently in the main memory 104. At step 604, the pseudo-timestamps of the tombstones that had been associated with the objects that were stored to disk are incremented. At step 606, the OID-to-tombstone entries of the objects that were stored to the storage device 107 are deleted from the OID-to-tombstone table 200. At step 608, a tombstone that is currently not in use is located.

At step 610, the object is loaded into main memory 104. At step 612 the virtual memory address field of the tombstone is set to the virtual memory address of the object. At step 614, an OID-to-tombstone entry is created for the new object and stored in the OID-to-tombstone table 200. At step 616 any references contained in the object are initialized. During initialization, the OID of each target object is stored in the OID field of each reference and the virtual memory address field is set to NULL.

If there is enough space in main memory to load the object, then control passes from step 600 to step 618. At step 618, it is determined whether an existing tombstone is currently unused. If an existing tombstone is currently unused, then control passes to step 608. If there are no unused tombstones, then control passes to step 620.

At step 620, a new tombstone is created. At step 622, the pseudo-timestamp of the new tombstone is set to an initial value, such as "1". Control then proceeds to step 610 where the loading process proceeds as described above.

TOMBSTONE MANAGEMENT

As mentioned above, objects may be stored from dynamic memory to disk to make room for new objects to be loaded into dynamic memory. When an object is stored to disk, the pseudo-timestamp of the tombstone that had been associated with the object is incremented, and the tombstone becomes available to be re-used with a new object.

The pseudo-timestamp of a tombstone must be maintained and the memory allocated to the tombstone can never de-allocated or re-used for any other purpose except as a tombstone because the system must assume that there may always be references still pointing to the tombstone. However, there may be no immediate need to re-use the tombstone. Consequently, at any given moment, there may be a pool of unused tombstones available for re-use.

According to one embodiment, tombstones are managed by maintaining the pool of currently-unused tombstones in a singly-linked list. In such an embodiment, step 618 of FIG. 6 involves checking whether any tombstone is available from the unused tombstone pool.

REFERENCE TRAVERSAL PROCESS

Figure 7:
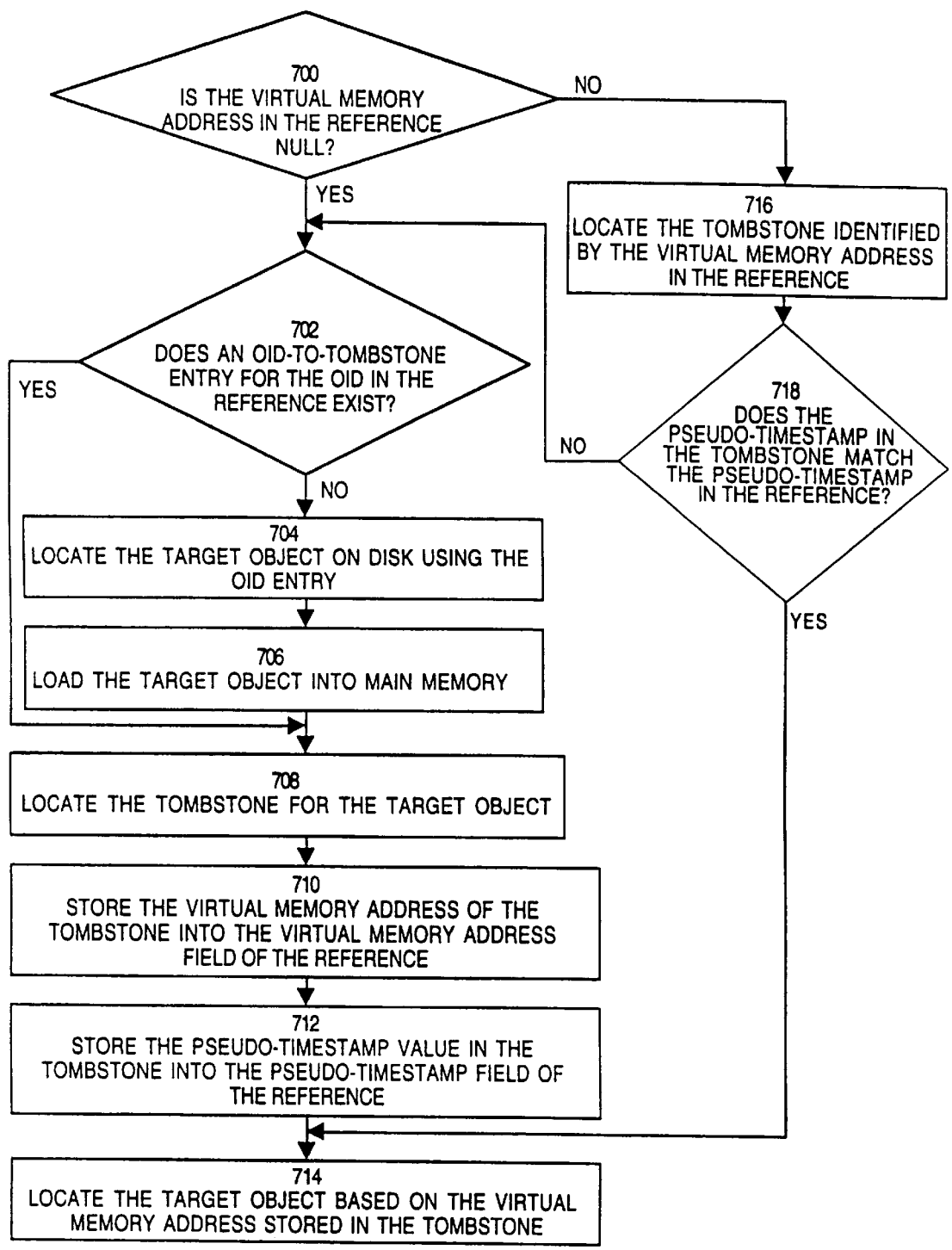
FIG. 7 is a flow chart illustrating steps performed to locate an object that corresponds to a reference according to an embodiment of the invention.

FIG. 7 is a flow chart that illustrates the steps performed during a reference traversal process according to an embodiment of the invention. At step 700, it is determined whether the virtual memory address in the reference to be traversed is NULL. If the virtual memory address in the reference is NULL, then control passes to step 702. Otherwise, control passes to step 716.

At step 702, it is determined whether an OID-to-tombstone entry for the OID in the reference exists. If an OID-to-tombstone entry for the OID in the reference exists, then control passes to step 708. Otherwise, control passes to step 704.

At step 704, the target object is located on the storage device 107 using the OID value in the reference. At step 706, the target object is loaded into the main memory 104. The target object is loaded according to the steps described above with reference to FIG. 6. Therefore, when the loading process is completed, a tombstone will have been associated with the target object.

At step 708, the tombstone for the target object is located. At step 710, the virtual memory address of the tombstone is stored in the virtual memory address field of the reference. At step 712, the pseudo-timestamp value in the tombstone is stored in the pseudo-timestamp field of the reference. At step 714, the target object is located based on the virtual memory address stored in the tombstone.

If the virtual memory address in the reference is not NULL, then control proceeds to step 716, where the tombstone identified by the virtual memory address in the reference is located. At step 718, it is determined whether the pseudo-timestamp in the tombstone matches the pseudo-timestamp in the reference. If the pseudo-timestamp in the tombstone does not match the pseudo-timestamp in the reference, then control passes to step 702. Otherwise, control passes to step 714 where the target object is located based on the virtual memory address stored in the tombstone.

According to an alternative embodiment, each tombstone stores the OID of the object to which it corresponds, rather than a pseudo-timestamp. In such an embodiment, a reference would only require two fields, a virtual memory address field and an OID field. In such an embodiment, an application determines whether a tombstone still corresponds to a target object of a reference by comparing the OID stored in the reference to the OID stored in the tombstone. If the OIDs match, then the virtual memory address stored in the tombstone is used to locate the target object. If the OIDs do not match, then the OID stored in the reference is used to locate the target object. When an object is stored out to disk, the OID field of the tombstone associated with the object is set to some predetermined value, such as NULL, until the tombstone is reused for another object.

In the foregoing specification, the invention has been described with reference to specific embodiments thereof. It will, however, be evident that various modifications and changes may be made thereto without departing from the broader spirit and scope of the invention. For example, the discussion above described the present invention with reference to references to objects contained in other objects. However, the present invention may be applied to reference swizzling for any type of information that is referenced during the execution of an application. The specification and drawings are, accordingly, to be regarded in an illustrative rather than a restrictive sense.

What is claimed is:

1. A method for locating a first set of data based on a reference that is an object attribute of the first set of data, the method comprising the steps of:

retrieving a first virtual memory address from the reference;

locating a data structure associated with the first set of data based on the first virtual memory address;

determining, based on data stored in the data structure, whether a second virtual memory address stored in the data structure corresponds to the first set of data; and if the data stored in the data structure indicates that the second virtual memory address corresponds to the first set of data, then locating the first set of data based on the second virtual memory address that is stored in the data structure.

2. The method of claim 1 wherein said first set of data resides in dynamic memory, the method further comprising a step of freeing up dynamic memory by performing the steps of:

deallocating dynamic memory that had been allocated for said first set of data; and updating data stored in the data structure to indicate that said second virtual memory address no longer corresponds to the first set of data.

3. The method of claim 2 further comprising the steps of:

determining whether the first set of data has been updated; and if said first set of data has been updated, then storing said first set of data to a persistent storage device before deallocating dynamic memory that had been allocated for said first set of data.

4. The method of claim 2 further comprising the steps of:

after updating data stored in the data structure to indicate that said second virtual memory address no longer corresponds to the first set of data, loading a third set of data into dynamic memory; and setting said second virtual memory address in said data structure to indicate where said third set of data resides in dynamic memory.

5. The method of claim 1 wherein:

the step of determining whether said second virtual memory address corresponds to the first set of data includes the step of comparing a first pseudo-timestamp that is stored in the reference to a second pseudo-timestamp that is stored in the data structure;

if the first pseudo-timestamp matches the second pseudo-timestamp, then performing step of locating the first set of data based on the second virtual memory address that is stored in the data structure; and if the first pseudo-timestamp does not match the second pseudo-timestamp, then locating the first set of data based on an identifier stored in the reference, the identifier uniquely identifying the first set of data.

6. The method of claim 5 wherein the step of locating the first set of data based on an identifier stored in the reference comprises the steps of:

inspecting a table that contains entries that associate identifiers with data structures; and if the table contains an entry that associates the identifier stored in the reference with a second data structure, then performing the steps of, locating the second data structure based on information that is contained in the entry, and locating the first set of data based on a third virtual memory address stored in the second data structure.

7. The method of claim 5 wherein the step of locating the first set of data based on an identifier stored in the reference comprises the steps of:

inspecting a table that contains entries that associate identifiers with data structures;

if the table does not contain an entry that associates the identifier stored in the reference with a second data structure, then performing the steps of:

locating the first set of data on a persistent storage device based on the identifier that is contained in the reference;

loading the first set of data into dynamic memory;

assigning said second data structure to the first set of data;

adding to the table an entry that associates the identifier with the second data structure;

storing in the second data structure a third virtual memory address that identifies where the first set of data is located in the dynamic memory;

replacing the first virtual memory address in the reference with a fourth virtual memory address that identifies where the second data structure is located; and storing in the reference a pseudo-timestamp that is contained in the second data structure.

8. The method of claim 6 further comprising the steps of:

replacing the first virtual memory address in the reference with a fourth virtual memory address that identifies where the second data structure is located; and replacing the pseudo-timestamp that is contained in the reference with a pseudo-timestamp that is contained in the second data structure.

9. The method of claim 6 further comprising the steps of:

determining whether the first virtual memory address has a predetermined value;

if the first virtual memory address does not have the predetermined value, then performing the step of locating the data structure associated with the first set of data based on the first virtual memory address;

if the first virtual memory address has the predetermined value, then locating the first set of data based on an identifier stored in the reference, the identifier uniquely identifying the first set of data.

10. The method of claim 9 wherein the step of determining whether the first virtual memory address has a predetermined value includes the step of determining whether the first virtual memory address is NULL.

11. A method for locating a first set of data based on a reference to the first set of data, the method comprising the steps of:

determining whether the reference has previously been used to locate the first set of data;

if the reference has previously been used to locate the first set of data, then performing the steps of:

retrieving a first virtual memory address from the reference;

locating a data structure associated with the first set of data based on the first virtual memory address;

comparing a first pseudo-timestamp that is stored in the reference to a second pseudo-timestamp that is stored in the data structure;

if the first pseudo-timestamp matches the second pseudo-timestamp, then performing the step of locating the first set of data based on a second virtual memory address that is stored in the data structure; and if the first pseudo-timestamp does not match the second pseudo-timestamp, then locating the first set of data based on an identifier stored in the reference, the identifier uniquely identifying the first set of data; and if the reference has not been previously used to locate the first set of data, then locating the first set of data based on the identifier stored in the reference.

12. The method of claim 11 wherein the step of locating the first set of data based on the identifier stored in the reference includes the steps of:

inspecting a table that contains entries that associate identifiers with data structures; and if the table contains an entry that associates the identifier stored in the reference with a second data structure, then performing the steps of:

locating the second data structure based on information that is contained in the entry; and locating the first set of data based on a third virtual memory address stored in the second data structure.

13. The method of claim 12 further comprising the step of:

if the table does not contain an entry that associates the identifier stored in the reference with the second data structure, then performing the steps of:

locating the first set of data on a persistent storage device based on the identifier that is contained in the reference;

loading the first set of data into dynamic memory;

assigning the second data structure to the first set of data;

adding to the table an entry that associates the identifier with the second data structure;

storing in the second data structure a third virtual memory address that identifies where the first set of data is located in the dynamic memory;

replacing the first virtual memory address in the reference with a fourth virtual memory address that identifies where the second data structure is located; and storing in the reference a pseudo-timestamp that is contained in the second data structure.

14. The method of claim 13 wherein:

the step of assigning a second data structure to the first set of data is performed by assigning to the first set of data a data structure that has previously been assigned to another set of data; and the method further includes the steps of:

storing said another set of data on said persistent storage device prior to assigning said second data structure to said first set of data; and incrementing the pseudo-timestamp stored in the second data structure upon storing said another set of data on said persistent storage device.

15. The method of claim 13 wherein:

the step of assigning a second data structure to the first set of data is performed by assigning to the first set of data a newly created data structure; and the method further comprises the step of setting the pseudo-timestamp in the particular data structure by initializing a pseudo-timestamp stored in the particular data structure to a predetermined value.

16. A computer system comprising:

memory that includes a dynamic memory portion;

a first object stored in the dynamic memory portion;

a second object stored in the dynamic memory portion, said second object including a reference to the first object; and a first data structure stored in the dynamic memory portion;

the first data structure storing:

a first pseudo-timestamp; and a first address that indicates where the first object is located in the dynamic memory portion;

the reference storing:

second address that indicates where the first data structure is located in the dynamic memory portion;

a second pseudo-timestamp; and a first object identifier that uniquely identifies the first object.

17. The computer system of claim 16 further comprising:

a table that has stored therein entries, wherein each entry contains an object identifier that uniquely identifies a corresponding object; and an address that indicates where a data structure that has been assigned to the corresponding object is located in the memory;

the table including an entry that contains the first object identifier, and the second address.

18. The computer system of claim 16 further comprising a processor configured to locate the first object based on the reference in the second object by performing the steps of:

determining whether the first object has been previously located based on the reference;

if the first object has been previously located based on the reference, then performing the steps of:

locating the first data structure based on the second address stored in the reference;

comparing the first pseudo-timestamp that is stored in the first data structure to the second pseudo-timestamp that is stored in the reference;

if the first pseudo-timestamp matches the second pseudo-timestamp, then locating the first object based on the first address that is stored in the first data structure; and if the first pseudo-timestamp does not match the second pseudo-timestamp, then locating the first object based on the first object identifier stored in the reference;

if the first object has not been previously located based on the reference, then locating the first object based on the first object identifier stored in the reference.

19. The computer system of claim 17 further comprising a processor configured to locate the first object based on the reference in the second object by performing the steps of:

determining whether the first object has been previously located based on the reference; and if the first object has not been previously located based on the reference, then locating the first object based on the first object identifier stored in the reference by:

inspecting the table to identify the entry that contains the first object identifier;

locating the first data structure based on the second address that is contained in the entry; and locating the first object based on the first address stored in the first data structure.

20. The computer system of claim 19 wherein:

the memory includes a persistent storage portion;

the processor is configured to store the first object to the persistent storage portion to free up space in the dynamic memory portion;

the processor is configured to remove the entry that contains the first object identifier from the table in response to storing the first object to the persistent storage portion; and the processor is configured to perform the following steps to locate the first object when the entry that contains the first object identifier has been removed from the table:

locating the first object on the persistent storage portion based on the first object identifier that is contained in the reference;

loading the first object into the dynamic memory portion;

assigning a second data structure to the first object;

adding to the table an entry that associates the first object identifier with the second data structure;

storing in the second data structure a third address that identifies where the first object is located in the dynamic memory portion;

replacing the second address in the reference with a fourth address that identifies where the second data structure is located; and storing in the reference a third pseudo-timestamp that is contained in the second data structure.

21. The computer system of claim 20 wherein:

the processor assigns the second data structure to the first object by assigning to the first object a data structure that has previously been assigned to another object; and the processor increments the third pseudo-timestamp stored in the second data structure prior to assigning the second data structure to the first object.

22. The computer system of claim 20 wherein:

the processor assigns the second data structure to the first object by assigning to the first object a newly created data structure; and the processor sets the third pseudo-timestamp by initializing a pseudo-timestamp stored in the second data structure to a predetermined value.

23. A method for locating a first set of data based on a reference to the first set of data, the method comprising the steps of:

determining whether the reference has previously been used to locate the first set of data;

if the reference has not been previously used to locate the first set of data, then locating the first set of data by performing the steps of:

inspecting an identifier stored in the reference, the identifier uniquely identifying the first set of data;

determining whether said identifier has been associated with any data structure that currently resides in dynamic memory;

if said identifier has been associated with any data structure that currently resides in dynamic memory, then performing the steps of:

locating the first data structure;

updating a virtual memory address in said reference to indicate where said first data structure resides in dynamic memory; and locating the first set of data based on a first virtual memory address stored in the first data structure; and if said identifier has not been associated with any data structure that currently resides in dynamic memory, then performing the steps of:

loading said first set of data into dynamic memory;

identifying a second data structure that resides in dynamic memory and that has previously been associated with a second set of data;

associating said second data structure with said first set of data by performing the steps of:

updating a virtual memory address stored in said second data structure to indicate where said first set of data resides in dynamic memory; and updating a virtual memory address in said reference to indicate where said second data structure resides in dynamic memory.

* * * * *